United States Patent
Radhakrishna

(10) Patent No.: US 6,823,414 B2
(45) Date of Patent: Nov. 23, 2004

(54) INTERRUPT DISABLING APPARATUS, SYSTEM, AND METHOD

(75) Inventor: Hiremane S. Radhakrishna, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 383 days.

(21) Appl. No.: 10/087,382

(22) Filed: Mar. 1, 2002

(65) Prior Publication Data

US 2003/0167366 A1 Sep. 4, 2003

(51) Int. Cl.$^7$ .......................... G06F 13/24; G06F 13/26; G06F 13/10
(52) U.S. Cl. .................. 710/262; 710/260; 709/301; 712/36
(58) Field of Search ................................. 710/260–266, 710/313, 48, 49; 714/34; 712/32, 36, 233, 244; 711/100; 344/418; 340/825; 370/908

(56) References Cited

U.S. PATENT DOCUMENTS

| | | | | |
|---|---|---|---|---|
| 3,676,861 A | * | 7/1972 | Ruth .......................... | 710/262 |
| 4,573,118 A | * | 2/1986 | Damouny et al. .......... | 712/234 |
| 5,848,237 A | * | 12/1998 | Cross et al. ................. | 714/34 |
| 6,581,119 B1 | * | 6/2003 | Maeda et al. ............... | 710/260 |
| 6,681,261 B2 | * | 1/2004 | Mancusi et al. ............ | 709/250 |

OTHER PUBLICATIONS

"High speed data bus macro instruction set architecture" by Prohofsky, T. (abstract only).*
"Rapid migration to VLSI" by Lowinski, W.B.; Kirwan, R.; Perry, A.; Yu, T. (abstract only).*

* cited by examiner

*Primary Examiner*—Gopal C. Ray
(74) *Attorney, Agent, or Firm*—Schwegman, Lundberg, Woessner & Kluth, P.A.

(57) ABSTRACT

An interrupt processing apparatus, system, and article including a machine-accessible medium, along with a method of processing interrupts, optimize interrupt-handling by combining the activities of acknowledging and disabling the interrupt. In one embodiment, the apparatus may include an interrupt cause register coupled to an interrupt disabling register and an interrupt mask register. The system may include a processor coupled to an interrupt cause register using a bus, along with an interrupt disabling register coupled to an interrupt mask register and the interrupt disabling register. The method may include reading an interrupt cause register in response to receiving an interrupt, and transferring a mask value stored in an interrupt disabling register directly to an interrupt mask register so as to disable receiving further interrupts from the interrupt source.

22 Claims, 3 Drawing Sheets

INTERRUPT DISABLING APPARATUS, SYSTEM, AND METHOD

TECHNICAL FIELD

Embodiments of the present invention relate generally to apparatus and methods used for program interrupt processing. More particularly, embodiments of the present invention relate to reducing the time required to respond to program interrupts, especially multiple interrupts in rapid succession.

BACKGROUND INFORMATION

A computer system typically includes one or more peripheral devices, such as, for example, a printer, disk drive, keyboard, video monitor, and/or a network interface card (NIC). Most peripheral devices coupled to a computer system generate an electrical signal, or interrupt, when they need some form of attention from a Central Processing Unit (CPU) or processor. This interrupt is usually an asynchronous event that suspends the normal processing operations of the CPU. For instance, a network controller might interrupt to indicate reception of a new packet, or to indicate the successful transmission of an outgoing packet.

Legacy devices generate interrupts by asserting an "interrupt line", which alerts the host processor to the interrupt. Newer devices may use a Message-Signaled Interrupt (MSI) instead, which makes use of the interrupting device to write a predetermined value (i.e., a message) to a predetermined address in host memory. For example, a network controller might write a special "packet received" message to memory upon receipt of an incoming packet. The MSI message value and address are typically unique to each device.

Computer architecture often makes use of a bus, such as the Peripheral Component Interconnect (PCI) bus, as a mechanism peripheral devices forming various parts of a computer system can use to communicate with each other. Further information on the operation of the PCI bus can be obtained by referring to the PCI Local Bus Specification, Version 2.2, Dec. 18, 1998, published at http://www.pcisig.com. However, most buses are shared, in the sense that more than one peripheral device, such as a network adapter, may reside on the bus at the same time. Thus, when more than one device attempts to communicate with another device on the bus, arbitration occurs, and the bus is granted to only one device at a time. Devices that are prevented from using the bus during this time must wait for the next arbitration cycle to obtain access.

Every access by a device residing on the bus constitutes a "transaction". Thus, each request to use the bus, arbitration, and grant to use the bus results in a separate transaction. Therefore, if the number of hardware access requests can be reduced, the efficiency of the bus can be increased.

This is quite apparent when there are multiple, high-speed network adapters communicating over a PCI bus. For example, since each adapter has to compete for bus access and participate in the arbitration process in order to process data within the computer system. Typically, each event that occurs in the context of network adapter operation is marked by an interrupt. To process the interrupts, the operating system calls an Interrupt Service Routine (ISR), which reads one or more registers in memory to discover the cause of the interrupt, usually logged in a hardware register called the "interrupt cause register", which is cleared upon being read, acknowledging the interrupt. Next, the ISR typically disables further interrupts from the interrupting device so that the currently-interrupting event can be processed in an unbroken fashion (i.e., without further interrupts from the same device that diverts CPU processing attention before the ISR has completed its function).

To disable further interrupts, an interrupt "mask" is usually written into a register called the "interrupt mask register". However, each access to the interrupt mask register typically constitutes a write operation across the bus. Thus, to increase the efficiency of bus operations, there is a need in the art for interrupt processing apparatus and systems, and methods of processing interrupts, which operate to reduce the number of bus transactions due to interrupting events.

DESCRIPTION OF THE EMBODIMENTS OF THE INVENTION

Figure 1:
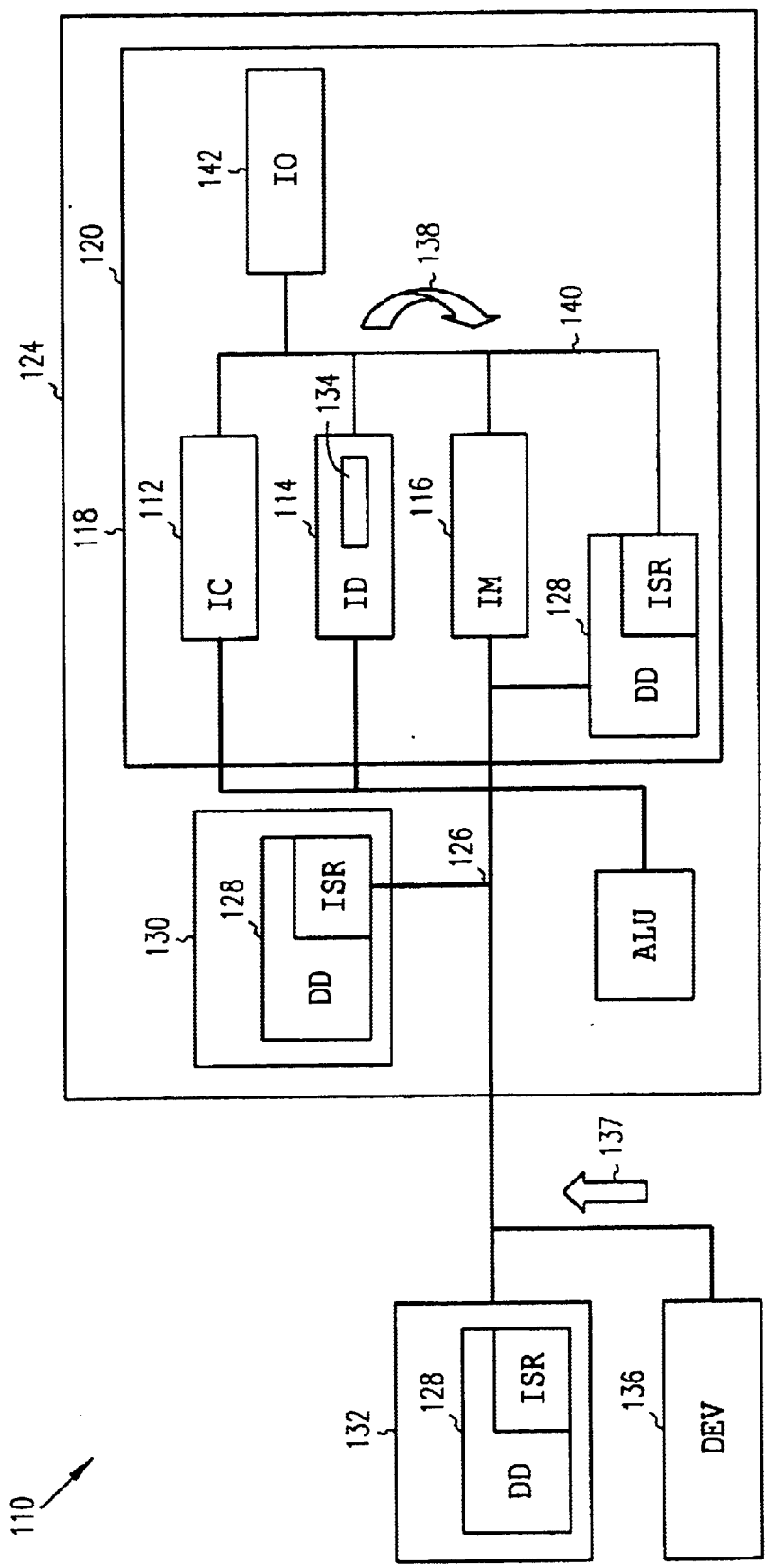
FIG. 1 is a block diagram of an apparatus and an article including a machine-accessible medium according to various embodiments of the present invention.

In the following detailed description of embodiments of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to understand and implement them. Other embodiments may be utilized and derived therefrom, such that structural and logical substitutions and changes may be made without departing from the scope of the present disclosure. The following detailed description, therefore, is not to be taken in a limiting sense, and the scope of embodiments of the invention is defined only by the appended claims, along with the full range of equivalents to which such claims are entitled.

Various embodiments of the invention optimize the interrupt-handling process by combining the activities of acknowledging and disabling the interrupt. Using a process which can be accomplished entirely in hardware, such that interrupts are disabled at approximately the same time they are acknowledged, there is no need to use explicit program instructions to write the disable mask value into the interrupt mask register, reducing the number of bus transactions. Using high-speed network adapters as an example, it is not uncommon to observe several thousand interrupts per second. Therefore, some embodiments of the present invention have the potential to save thousands of bus accesses per second, decreasing bus utilization due to interrupt generation. Such a scheme should be useful for many types of buses, including the PCI bus, and its enhanced version, the PCI-X bus.

FIG. 1 is a block diagram of an apparatus and an article including a machine-accessible medium according to various embodiments of the present invention. In one embodiment, the apparatus 110 may include an interrupt cause register 112, an interrupt disabling register 114, and an interrupt mask register 116, each capable of being operatively coupled to the other. Each of the registers 112, 114, 116 may, for example, be included in a single monolithic memory circuit 118, or in a single programmable interrupt controller 120. Alternatively, each of the registers 112, 114, 116 may be separated into various physical entities, such as separate memories and/or processors, and/or peripheral devices.

Typically, an arithmetic logic unit 122 (ALU), as is commonly included in a processor 124, will be operatively coupled to the interrupt mask register 116, as well as the other registers 112, 114 so as to direct read/write operations from/to the registers 112, 114, 116 over some form of a bus 126, such as a PCI or PCI-X bus. A device driver 128, which may exist in the form of a software program module or firmware, for example, is capable of being operatively coupled to the registers 112, 114, 116, either directly, or via the ALU 122. The device driver 128 may reside within the same memory 118 or other device, such as a programmable interrupt controller 120, as the registers 112, 114, 116. The driver 128 may also form part of a processor 124 which includes the registers 112, 114, 116. Finally, the driver 128 may be physically separated from the registers 112, 114, 116, perhaps as part of a separate memory 132.

During operation of the embodiment illustrated in FIG. 1, one or more interrupt disable masks 134 may be stored in the interrupt disabling register 114. Mask values may be written to the register by a programmer, by the source of a particular interrupt being masked, by a computer operating system, or as a default value put in place upon the application of power to the register 114.

For example, assuming that the initial disabling mask value 134 stored in the interrupt disabling register 114 is preprogrammed by a device driver 128 associated with a particular device 136 and an interrupt 137 during an operating system initialization process. This mask value 134 can then be used to disable the interrupt 137 serviced by an ISR, possibly residing within the driver 128.

One possible sequence of operations involving the illustrated embodiment might be initiated with the generation of an interrupt 137 by a device 136 requesting service. At this point, an operating system may make a call to the relevant ISR routine, which accesses the bus 126 to read the interrupt cause register 112. Reading the register 112 results in clearing the register 112, acknowledging the interrupt 137. At approximately the same time, further interrupts 137 from the same device 136 can be disabled by a transfer operation 138 which takes the content (mask 134) directly from the interrupt disabling register 114 and places it into the interrupt mask register 116. The direct transfer/write operation is triggered by reading the register 112, and may occur using a separate bus 140, for example. Thus, the need for a software program write operation across the system bus 126 to place the contents of an interrupt disabling mask into the interrupt mask register 116 can be obviated.

The apparatus 110 may also include an interrupt disabling override register 142 capable of being operatively coupled to the interrupt mask register 116. The override register 142 may be used, for example, by a programmer to override the activity of the interrupt disabling register 114. For example, if the disabling register 114 is initialized by the startup activity of a device driver 128 to a particular value 134, any other value written into the override register may be used to overwrite the value 134, or be placed directly into the mask register 116 from the override register 142, upon reading the cause register 112. The particular operational sequence and function of the override register 142 may be selected by the designer of the apparatus 110, as desired.

Figure 2:
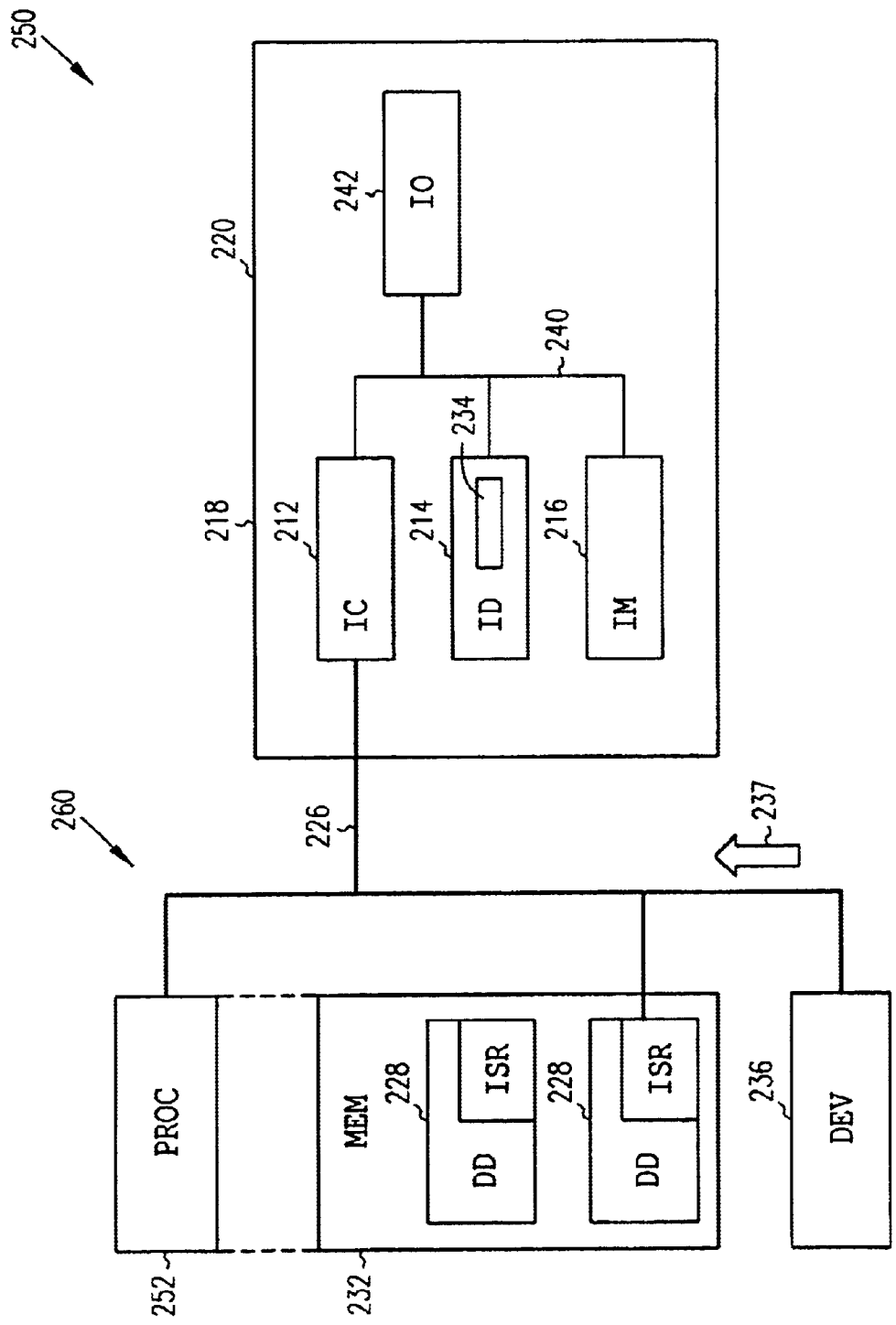
FIG. 2 is a block diagram of a system according to an embodiment of the present invention.

FIG. 2 is a block diagram of a system 250 according to an embodiment of the present invention. System 250 may include a processor 252 capable of being operatively coupled to an interrupt cause register 212, either directly, or using a bus 226, such as a PCI or PCI-X bus. The system also includes an interrupt disabling register 214 and an interrupt mask register 216, each capable of being operatively coupled to the interrupt cause register 212, and to each other. An interrupt disabling override register 242 may also be included in the system 250, and may be operatively coupled to the other registers 212, 214, 216. The registers 212, 214, 216, and 242 may be included in a memory 218, or a programmable interrupt controller 220, as described previously regarding the embodiment shown in FIG. 1.

The system may also comprise a device 236 capable of generating an interrupt, as well as a memory 232, each capable of being operatively coupled to the processor 252 and/or the bus 226. The memory 232 may also be formed as an integral part of the processor 252. Typical devices 236 may include, for example, network adapters, graphics display controllers, storage devices, such as memory and disk drives, and/or disk drive controllers, among others. The memory 232 may be used to store a set of program instructions comprising a portion of an ISR, perhaps residing in a device driver 228. In any case, however, reading the interrupt cause register 212 in response to an interrupt 237 generated by a device 236 coupled to the processor 252 (e.g., via the bus 226) results in transferring a mask value 234 stored in the interrupt disabling register 214 directly to the interrupt mask register 216, perhaps using an internal bus 240.

Regarding both FIGS. 1 and 2, it should be noted that the apparatus 110; registers 112, 114, 116, 142, 212, 214, 216, 242; memories 118, 130, 132, 218, 232; programmable interrupt controllers 120, 220; ALU 122; processors 124, 252; device drivers 128, 228; and devices 136, 236 may all be characterized as "modules" herein. Such modules may include hardware circuitry, such as a microprocessor and/or memory circuits, software program modules, and/or firmware, and combinations thereof, as directed by the architect of the apparatus 110 and system 250, and as appropriate for particular implementations of various embodiments of the invention.

One of ordinary skill in the art will understand that the apparatus and system of various embodiments of the present invention can be used in applications other than desktop computers and systems that include networked servers or devices, and thus, the invention is not to be so limited. The illustrations of an apparatus 110 and a system 250 are intended to provide a general understanding of the structure of various embodiments of the present invention, and they are not intended to serve as a complete description of all the elements and features of apparatus and systems that might make use of the structures described herein.

Applications that may include the novel apparatus and system of various embodiments of the present invention include electronic circuitry used in high-speed computers, communications and signal processing circuitry, processor modules, embedded processors, and application-specific modules, including multilayer, multi-chip modules. Such apparatus and systems may further be included as subcomponents within a variety of electronic systems, such as televisions, cellular telephones, personal computers, radios, vehicles, and others.

Figure 3:
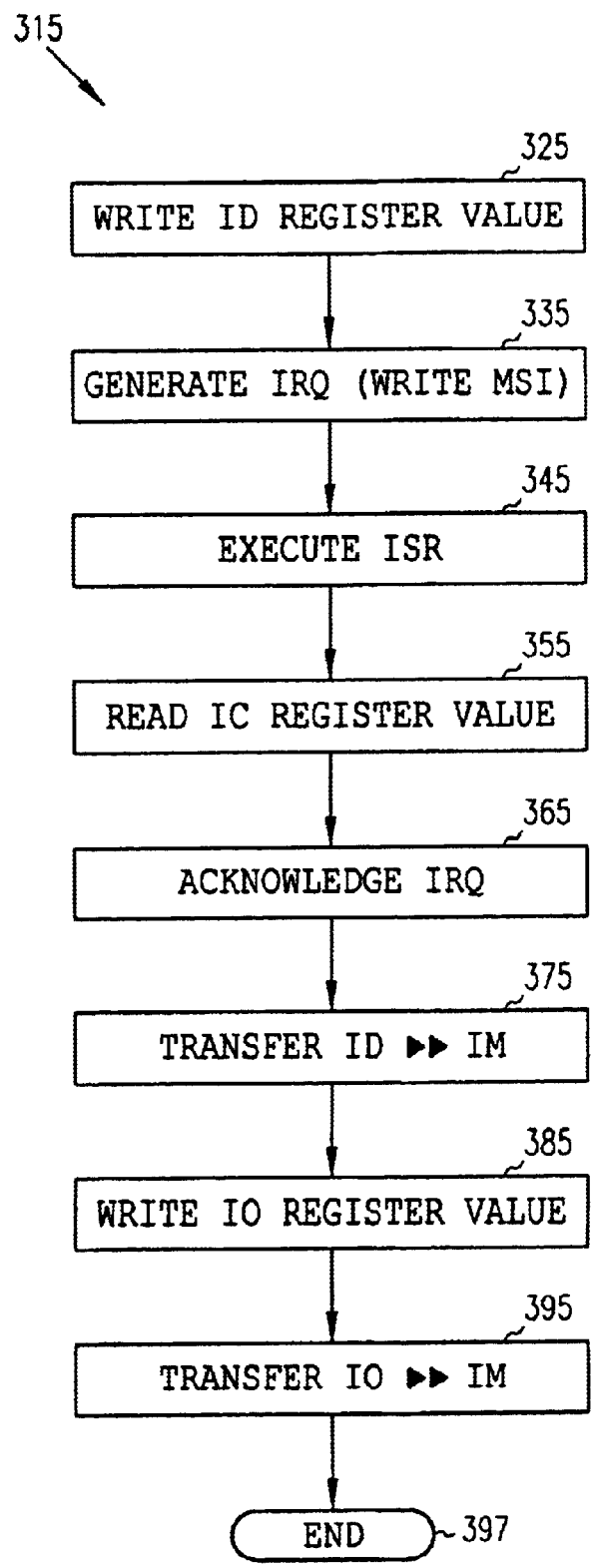
FIG. 3 illustrates a flow diagram of a method for processing interrupts according to an embodiment of the present invention.

FIG. 3 illustrates a flow diagram of a method for processing interrupts according to an embodiment of the present invention. The method 315 may include writing an initial value or interrupt disabling mask into an interrupt disabling register at block 325, generating an interrupt at block 335 (e.g., by writing an interrupt message value into a predefined memory location as part of an MSI procedure), and executing an ISR at block 345.

The method may continue with reading an interrupt cause register in response to receiving the interrupt at block 355, acknowledging the interrupt at block 365 (e.g., the activities of blocks 355 and 365 may occur during execution of the ISR), and transferring the value stored in the interrupt disabling register (corresponding to and appropriate for the source of the interrupt) directly to an interrupt mask register at block 375. The activity of transferring the mask value directly to the interrupt disabling register has the effect of disabling the reception of further interrupts from the source of the masked interrupt without using the standard peripheral bus. At this time, the method may continue with generating a multiplicity of interrupts (using the same source, if desired), repeatedly reading the interrupt cause register in response to receiving the multiple interrupts, and repeatedly transferring the mask value stored in the interrupt disabling register directly to the interrupt mask register at blocks 335, 345, 355, 365, and 375.

Alternatively, the method may continue with writing an override value to an interrupt disabling override register at block 385, and transferring the override value directly to the interrupt mask register so as to enable receiving further interrupts from the interrupt source at block 395. This activity may occur, for example, when reception of further interrupts from the source of the interrupt is critical, even during the processing of a previous interrupt. It may also be useful to enable interrupts which may be disabled due to the automated activity on the part of an operating system or device driver, such as when the interrupt disabling register is preprogrammed with default values during a software initialization sequence.

It should be noted that while MSIs have been used as an example of an interrupt generation mechanism herein, other mechanisms, including PCI interrupts, may also be used according to various embodiments of the invention, and therefore, the invention is not to be so limited. Therefore, it should be clear that the some embodiments of the present invention may also be described in the context of computer-executable instructions, such as program modules, being executed by a computer. Generally, program modules may include routines, programs, objects, components, data structures, etc. that perform particular tasks or implement particular abstract data types. As such, and referring back to FIGS. 1 and 2, the memories 118, 130, 132, 218, 232 of various embodiments of the present invention may include software operative on the ALU 122 and/or processor 252 to perform methods according to the teachings disclosed herein.

One of ordinary skill in the art will understand, upon reading and comprehending this disclosure, the manner in which a software program can be launched from a computer-readable medium in a computer based system to execute the functions defined in the software program. One of ordinary skill in the art will further understand the various programming languages which may be employed to create a software program designed to implement and perform the method embodiments of the present invention. The programs can be structured in an object-orientated format using an object-oriented language such as Java, Smalltalk, or C++. Alternatively, the programs can be structured in a procedure-orientated format using a procedural language, such as COBOL or C. The software components may communicate using any of a number of mechanisms that are well-known to those skilled in the art, such as Application Program Interfaces (APIs) or interprocess communication techniques such as the Remote Procedure Call (RPC), Common Object Request Broker Architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of various embodiments of the present invention are not limited to any particular programming language or environment.

As is evident from the preceding description, and in referring back to FIGS. 1 and 2, the ALU 122 and/or processor 252 typically accesses at least some form of computer-readable media, such as the memories 118, 130, 132, 218, 232. However, computer-readable and/or accessible media may be any available media that can be accessed by the apparatus 110, ALU, 122, processor 252, and system 250. By way of example and not limitation, computer-readable media may comprise computer storage media and communications media. Computer storage media includes volatile and non-volatile, removable and non-removable media implemented using any method or technology for storage of information such as computer-readable instructions, data structures, program modules or other data. Communication media specifically embodies computer-readable instructions, data structures, program modules or other data present in a modulated data signal such as a carrier wave, coded information signal, and/or other transport mechanism, which includes any information delivery media. The term "modulated data signal" means a signal that has one or more of its characteristics set or changed in such a manner as to encode information in the signal. By way of example and not limitation, communications media also includes wired media such as a wired network or direct-wired connections, and wireless media such as acoustic, optical, radio frequency, infrared and other wireless media. Combinations of any of the above are also be included within the scope of computer-readable and/or accessible media.

Thus, referring back to FIG. 2, it is now easily understood that another embodiment of the invention may include an article 260 comprising a machine-accessible medium 232 having associated data, wherein the data, when accessed, results in a machine (e.g. a processor 252 or computer) performing activities such as reading an interrupt cause register 212 in response to receiving an interrupt 237, and transferring a mask value 234 stored in an interrupt disabling register 214 (corresponding to and appropriate for) the source 236 of the interrupt directly to an interrupt mask register 216 so as to disable receiving further interrupts 237 from the interrupt source 236. Other activities performed may include, for example, writing a message signaling interrupt message to a memory location to generate an interrupt 237, and refraining from accessing a bus 226 coupled to the source 236 of the interrupt and the interrupt cause register 212 in order to transfer the mask value 234 to the interrupt mask register 216. Further activities may include generating a multiplicity of interrupts 237 using one or more sources 236, repeatedly reading the interrupt cause register 212 in response to receiving multiple interrupts 237 and repeatedly transferring the mask value 234 stored in the interrupt disabling register 214 directly to the interrupt mask register 216, as noted above.

Thus, various embodiments of the invention may provide a mechanism for increasing bus throughput and efficiency by offloading the task of disabling interrupts using a direct transfer process, possibly implemented entirely in hardware. This may be particularly effective in the case of network adapters, which tend to post several thousand interrupts per second.

Although specific embodiments have been illustrated and described herein, those of ordinary skill in the art will appreciate that any arrangement which is calculated to achieve the same purpose may be substituted for the specific embodiments shown. This disclosure is intended to cover any and all adaptations or variations of various embodiments of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Thus, the scope of the embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

What is claimed is:

1. An apparatus, comprising:

an interrupt cause register;

an interrupt disabling register capable of being operatively coupled to the interrupt cause register; and an interrupt mask register capable of being operatively coupled to the interrupt disabling register.

2. The apparatus of claim 1, wherein the interrupt cause register, the interrupt disabling register, and the interrupt mask register are included in a single monolithic memory circuit.

3. The apparatus of claim 1, wherein the interrupt cause register, the interrupt disabling register, and the interrupt mask register are included in a single programmable interrupt controller.

4. The apparatus of claim 1, further comprising:

an arithmetic logic unit capable of being operatively coupled to the interrupt mask register.

5. The apparatus of claim 1, further comprising:

an interrupt disabling override register capable of being operatively coupled to the interrupt mask register.

6. The apparatus of claim 1, further comprising:

a device driver capable of being operatively coupled to the interrupt disabling register.

7. A system, comprising:

a processor;

a bus capable of being operatively coupled to the processor;

an interrupt cause register capable of being operatively coupled to the bus;

an interrupt disabling register capable of being operatively coupled to the interrupt cause register; and an interrupt mask register capable of being operatively coupled to the interrupt disabling register.

8. The system of claim 7, further comprising:

a device capable of generating an interrupt and capable of being operatively coupled to the bus.

9. The system of claim 8, wherein the device is a network adapter.

10. The system of claim 8, wherein the device is a graphics display controller.

11. The system of claim 8, wherein the device is a storage device.

12. The system of claim 7, wherein the bus is a Peripheral Component Interconnect (PCI) bus.

13. The system of claim 7, wherein reading the interrupt cause register in response to an interrupt generated by a device operatively coupled to the processor results in transferring a value stored in the interrupt disabling register to the interrupt mask register.

14. The system of claim 7, further comprising:

a memory capable of being operatively coupled to the processor, the memory being used to store a set of program instructions comprising a portion of an interrupt service routine.

15. A method, comprising:

reading an interrupt cause register in response to receiving an interrupt; and transferring a value stored in an interrupt disabling register corresponding to a source of the interrupt to an interrupt mask register so as to disable receiving further interrupts from the source of the interrupt.

16. The method of claim 15, further comprising:

generating the interrupt.

17. The method of claim 15, further comprising:

executing an interrupt service routine to acknowledge the interrupt.

18. The method of claim 15, further comprising:

writing an override value to an interrupt disabling override register; and transferring the override value to the interrupt mask register so as to enable receiving further interrupts from the source of the interrupt.

19. An article comprising a machine-accessible medium having associated data, wherein the data, when accessed, results in a machine performing:

reading an interrupt cause register in response to receiving an interrupt; and transferring a value stored in an interrupt disabling register corresponding to a source of the interrupt to an interrupt mask register so as to disable receiving further interrupts from the source of the interrupt.

20. The article of claim 19, wherein the machine-accessible medium further includes data, which when accessed by the machine, results in the machine performing:

writing a message signaling interrupt message to a memory location.

21. The article of claim 19, wherein transferring a value stored in an interrupt disabling register corresponding to a source of the interrupt to an interrupt mask register includes:

refraining from accessing a bus capable of being operatively coupled to the source of the interrupt and the interrupt cause register.

22. The article of claim 19, wherein the machine-accessible medium further includes data, which when accessed by the machine, results in the machine performing:

generating a multiplicity of interrupts using the source of the interrupt;

repeatedly reading the interrupt cause register in response to receiving the multiplicity of interrupts; and repeatedly transferring the value stored in the interrupt disabling register corresponding to the source of the interrupt to the interrupt mask register.

* * * * *